(12) United States Patent
Kataoka et al.

(10) Patent No.: US 11,130,523 B2
(45) Date of Patent: Sep. 28, 2021

(54) DRIVING SUPPORTER

(71) Applicants: TOYOTA JIDOSHA KABUSHIKI KAISHA, Toyota (JP); DENSO CORPORATION, Kariya (JP)

(72) Inventors: Hiroaki Kataoka, Toyota (JP); Taisuke Hasegawa, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 814 days.

(21) Appl. No.: 15/881,112

(22) Filed: Jan. 26, 2018

(65) Prior Publication Data
US 2018/0229770 A1 Aug. 16, 2018

(30) Foreign Application Priority Data
Feb. 13, 2017 (JP) .............................. JP2017-023778

(51) Int. Cl.
| | |
|---|---|
| *B62D 15/02* | (2006.01) |
| *G06K 9/00* | (2006.01) |
| *B62D 1/28* | (2006.01) |
| *G05D 1/00* | (2006.01) |

(52) U.S. Cl.
CPC ......... *B62D 15/0265* (2013.01); *B62D 1/286* (2013.01); *B62D 15/025* (2013.01); *B62D 15/026* (2013.01); *B62D 15/029* (2013.01); *G05D 1/00* (2013.01); *G06K 9/00798* (2013.01); *G06K 9/00805* (2013.01)

(58) Field of Classification Search
CPC .. B62D 15/0265; B62D 1/286; B62D 15/025; B62D 15/026; B62D 15/029; B62D 1/28; B62D 15/02; B62D 15/00; G05D 1/00; G06K 9/00798; G06K 9/00805; G06K 9/00791; B60W 60/00; B60W 60/007
USPC .......................................................... 701/28
See application file for complete search history.

(56) References Cited

U.S. PATENT DOCUMENTS

| | | | |
|---|---|---|---|
| 7,516,003 B2* | 4/2009 | Maeda | B62D 1/286 180/204 |
| 9,182,761 B2* | 11/2015 | Fujita | G05D 1/0212 |
| 9,308,914 B1* | 4/2016 | Sun | B60K 28/06 |

(Continued)

FOREIGN PATENT DOCUMENTS

JP  2010-271999 A  12/2010

*Primary Examiner* — Thomas G Black
*Assistant Examiner* — Matthias S Weisfeld
(74) *Attorney, Agent, or Firm* — Sughrue Mion, PLLC

(57) ABSTRACT

A driving supporter includes a support inhibitor that inhibits support of driving when a steering-operation value is greater than a threshold value. The support inhibitor includes a threshold-value determiner that determines the threshold value to a value greater when a first object and a second object are present than when the first object is present, and the second object is absent. The first object has a relationship in which a relative positional relationship between the object and an own vehicle is a relationship in which a steering operation is estimated to be performed in a first direction in which the own vehicle avoids the object. The second object has a relationship in which the relative positional relationship is a relationship in which the steering operation is estimated to be performed in a second direction reverse to the first direction such that the own vehicle avoids the object.

10 Claims, 13 Drawing Sheets

(56) References Cited

U.S. PATENT DOCUMENTS

| | | | |
|---|---|---|---|
| 10,496,090 B2 * | 12/2019 | Latotzki | B60W 60/0057 |
| 2005/0267661 A1 * | 12/2005 | Iwazaki | B62D 1/286 |
| | | | 701/41 |
| 2008/0065286 A1 * | 3/2008 | Han | G01S 19/48 |
| | | | 701/28 |
| 2008/0106462 A1 * | 5/2008 | Shiraishi | G01S 11/12 |
| | | | 342/146 |
| 2010/0295668 A1 | 11/2010 | Kataoka | |
| 2016/0229410 A1 * | 8/2016 | Clarke | B60T 7/12 |

* cited by examiner

DRIVING SUPPORTER

CROSS REFERENCE TO RELATED APPLICATION

The present application claims priority from Japanese Patent Application No. 2017-023778, which was filed on Feb. 13, 2017, the disclosure of which is herein incorporated by reference in its entirety.

BACKGROUND

The following disclosure relates to a driving supporter configured to support driving of a driver.

Patent Document 1 (Japanese Patent Application Publication No. 2010-271999) discloses a driving supporter configured to support driving in order to prevent a departure of a vehicle from a lane. In the driving supporter disclosed in Patent Document 1, an electric steering device is controlled to apply steering torque in the case where there is a possibility of a departure of the vehicle from a lane. This operation prompts a driver to perform driving so as to prevent the departure of the vehicle from the lane.

SUMMARY

Accordingly, an aspect of the disclosure relates to improvement of a driving supporter, for example, appropriate driving support with reduced discomfort given to a driver.

A driving supporter according to the present aspect is configured to perform driving support such that an own vehicle runs within a lane. In the present driving supporter, the driving support is inhibited when a steering operation value is greater than a threshold value. The threshold value is determined to a value that is greater when there are objects A, B than when the object A is present, and the object B is absent. A relative positional relationship between the object A and the own vehicle is a relationship in which it is estimated that a steering operation is to be performed in a direction in which the own vehicle avoids the object A. A relative positional relationship between the object B and the own vehicle is a relationship in which it is estimated that the steering operation is to be performed in a direction reverse to the above-described direction such that the own vehicle avoids the object B.

In the case where the object A is present, and the object B is absent, when a possibility of a departure of the own vehicle from the lane is increased due to the steering operation performed by the driver in the direction in which the own vehicle avoids the object A, steering torque in a direction in which the departure of the own vehicle from the lane is prevented is in some cases applied as the driving support, for example. However, the direction of the steering torque applied as the driving support is reverse to that of the steering operation performed by the driver, which gives discomfort to the driver. To solve this problem, in the present driving supporter, the threshold value is determined to a small value. This processing makes it difficult for the driving support to be executed, resulting in reduced discomfort given to the driver.

In contrast, for example, in the case where both of the object A and the object B are present, when the steering operation is performed by the driver in the direction in which the own vehicle avoids the object A, steering torque in a direction reverse to the direction of the steering operation performed by the driver is in some cases applied as the driving support. The direction of this steering torque applied as the driving support is the same as that of the steering operation performed such that the own vehicle avoids the object B. Thus, even when the driving support is performed, the driver feels little discomfort. In the case where both of the object A and the object B are present, the driving support for causing the own vehicle to run within the lane is preferable for the driver in some cases. Thus, when the driving support is not performed, the driver may feel discomfort. In the present driving supporter, in the case where both of the object A and the object B are present, the threshold value is determined to a value that is greater than a value taken in the case where one of the object A and the object B is present, and the other is absent. This processing makes it easier for the driving support to be performed. Accordingly, the present driving supporter is capable of perform appropriate driving support while reducing discomfort given to the driver.

It is noted that the driving supporter may include at least one of (i) a departure-prevention supporter configured to support driving to prevent a departure of the own vehicle from the lane and (ii) a lane-keeping supporter configured to support driving such that the own vehicle runs along a target traveling line extending through a substantially center of the lane, for example. The driving supporter may be configured to apply steering torque as the driving support and may be configured to notify about a high possibility of the departure of the own vehicle from the lane. Examples of the steering-operation value include: steering torque applied by an operation of a steering operation member by the driver; a steering force; and a steering amount of the steering operation member; and an operating speed. Examples of the object include a vehicle, a person, a guard rail, and a wall.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Figure 1:
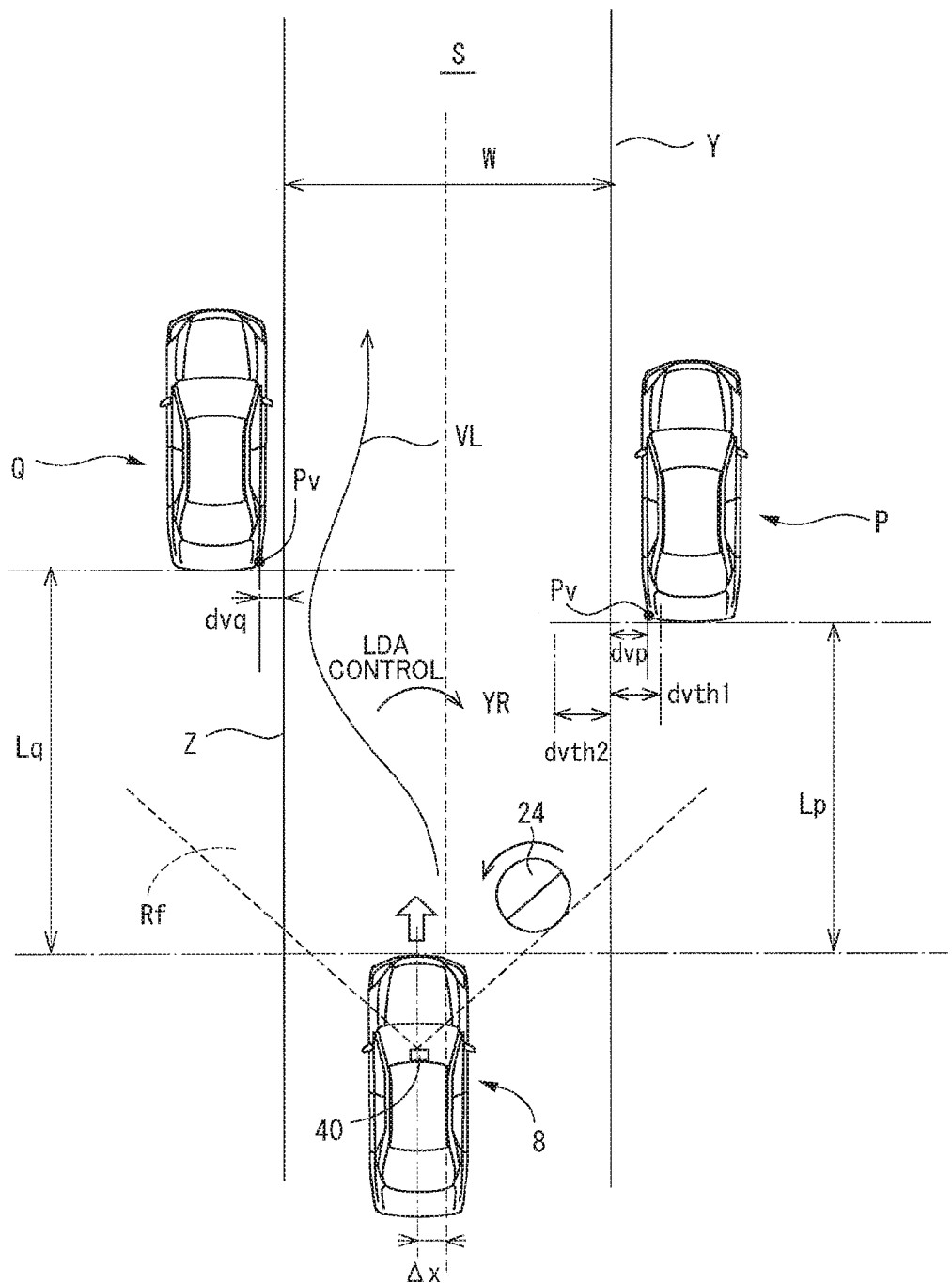
FIG. 1 is a view illustrating a relative positional relationship between an object and an own vehicle including a driving supporter according to a first embodiment.
Figure 2:
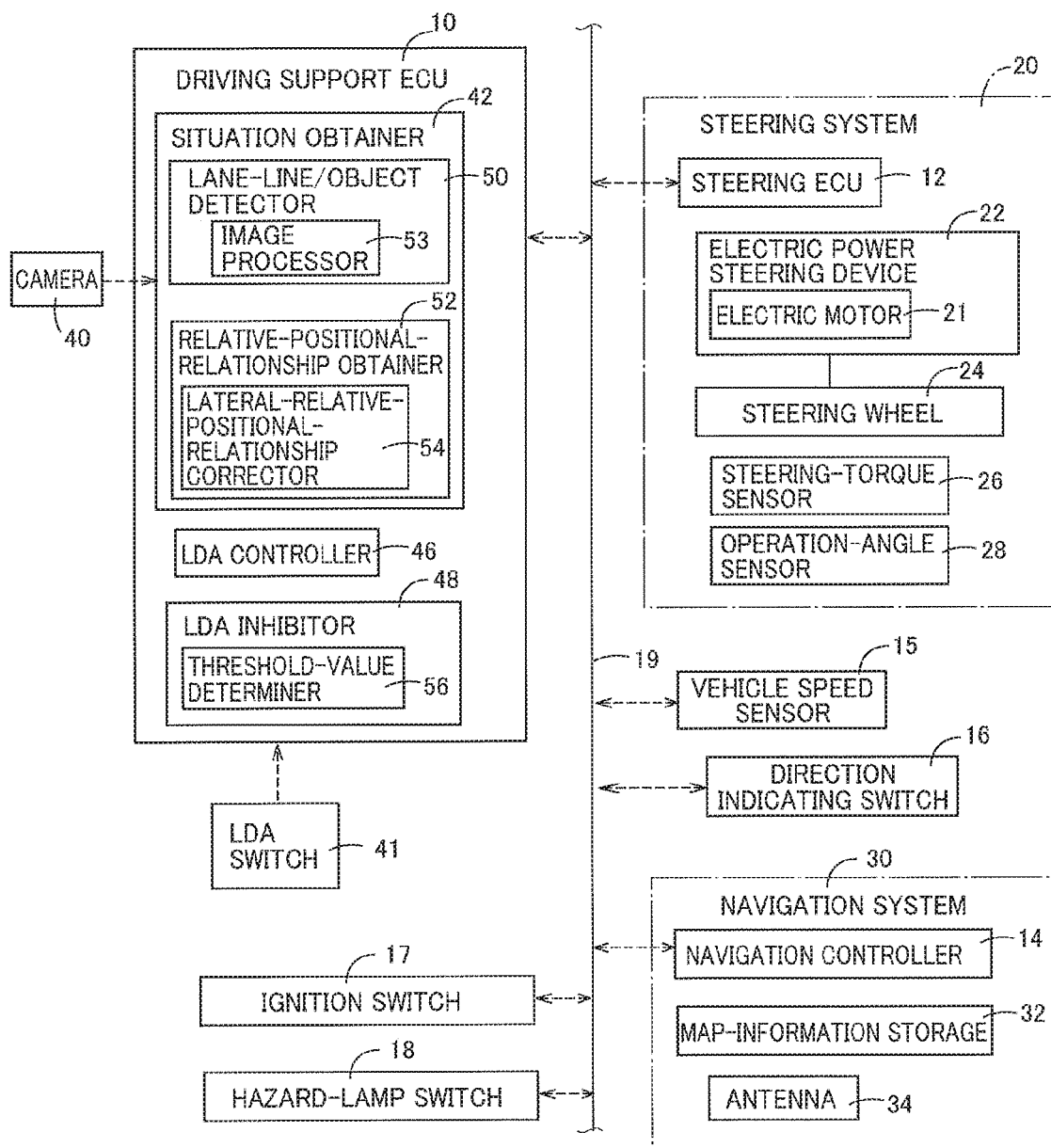
FIG. 2 is a block diagram conceptually illustrating the driving supporter.

A driving supporter according to the present embodiment is installed in an own vehicle 8 illustrated in FIG. 1. As illustrated in FIG. 2, the own vehicle 8 includes a driving support electric control unit (ECU) 10, a steering ECU 12, a navigation controller 14, a vehicle speed sensor 15, a direction indicating switch 16, an ignition switch 17 as one example of a main switch, and a hazard-lamp switch 18. These devices are communicably connected to each other over a controller area network (CAN) 19. The vehicle speed sensor 15 detects a vehicle speed Vs as a running speed of the own vehicle 8. The direction indicating switch 16 is operable by a driver and indicates a direction of travel of the own vehicle 8 (which corresponds to a direction of a steering operation) when the steering operation is performed. The hazard-lamp switch 18 is turned on to light up hazard lamps, not illustrated. For example, the hazard-lamp switch 18 is turned on when the own vehicle 8 is parked by going off an own lane S on which the own vehicle 8 travels.

The steering ECU 12 is an element of a steering system 20 and principally constituted by a computer including an executer, a storage, and an input/output device. The steering system 20 includes: an electric power steering device 22 including an electric motor 21; a steering wheel 24 as a steering operation member; a steering-torque sensor 26; and an operation-angle sensor 28. The electric motor 21, the steering-torque sensor 26, and the operation-angle sensor 28 are connected to the input/output device of the steering ECU 12, for example.

The electric power steering device 22 is configured to turn steered road wheels by using (i) steering torque applied from the driver to a steering mechanism via the steering wheel 24 and (ii) steering torque applied from the electric motor 21 to the steering mechanism. The steering ECU 12 controls the electric motor 21 to control the steering torque applied to the steering mechanism by the electric motor 21. Examples of application of the steering torque to the steering mechanism include: application of the steering torque to the steering mechanism in the same direction as a direction of the steering operation performed by the driver; and application of the steering torque to the steering mechanism in a direction reverse to the direction of the steering operation performed by the driver.

The steering-torque sensor 26 is configured to detect steering torque Ts applied from the driver via the steering wheel 24 to a torsion bar of the steering mechanism. The steering-torque sensor 26 outputs, as a positive value, steering torque applied by a turn of the steering wheel 24 in the right direction and outputs, as a negative value, steering torque applied by a turn of the steering wheel 24 in the left direction. The operation-angle sensor 28 is configured to detect an operated angle of the steering wheel 24 from a reference position. The reference position of the steering wheel 24 is a position of the steering wheel 24 in the case where the own vehicle 8 is driving straight ahead.

The navigation controller 14 is an element of a navigation system 30 and is principally constituted by a computer including an executer, not illustrated, a storage, and an input/output device. Devices connected to the input/output device include: a map-information storage 32 storing map information and other information; and an antenna 34. A current position of the own vehicle 8 on a map is obtained based on (i) positional information on the own vehicle 8 which is created based on, e.g., a signal received via the antenna 34 from an artificial satellite for a global positioning system (GPS) and (ii) the map information stored in the map-information storage 32. This current position is displayed on a display, not illustrated. Road information (e.g., a lane width) on the own lane S on which the own vehicle 8 is running is also obtainable based on the map information and the positional information. A current traffic volume (e.g., the presence or absence of a traffic jam), weather, and the like surrounding the own vehicle 8 are obtainable based on, e.g., traffic information and weather information received via the antenna 34. Hereinafter, information received via the antenna 34 of the present navigation system 30 may be referred to as "navigation information".

The driving support ECU 10 is principally constituted by a computer including an executer, not illustrated, a storage, and an input/output device. Devices connected to the input/output device include: a camera 40 capable of taking an image representing a view on a front and front lateral sides of the own vehicle 8; and a lane-departure-alert (LDA) switch 41. The camera 40 includes a charge coupled device (CCD) or a complementary metal oxide semiconductor (CMOS) as an image pickup device, for example. The camera 40 takes an image including an object, a lane line, and so on in a region Rf. In the present embodiment, the region Rf in which the image including the object, the lane line, and so on is taken by the camera 40 is located on a front side and front lateral sides of the own vehicle 8. The LDA switch 41 is operable by the driver and turned on when the driver permits execution of the LDA control as driving support.

The driving support ECU 10 includes a situation obtainer 42, an LDA controller 46, and an LDA inhibitor 48. The situation obtainer 42 is configured to obtain a situation in the region Rf based on, e.g., the image taken by the camera 40. The situation obtainer 42 includes a lane-line/object detector 50 and a relative-positional-relationship obtainer 52.

Figure 10:
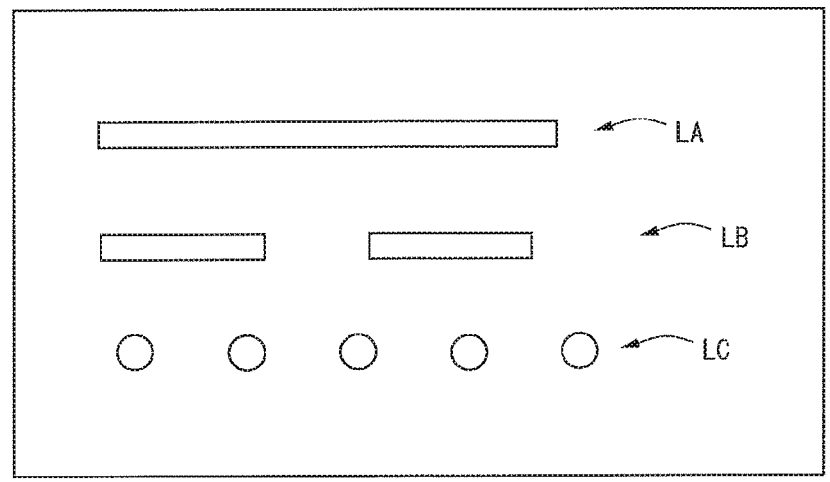
FIG. 10 is a view illustrating some types of lane lines.

The lane-line/object detector 50 includes an image processor 53 configured to process the image taken by the camera 40. The lane-line/object detector 50 is configured to process the taken image to detect the lane line and the object. Examples of the lane line include a center line on a roadway, a lane boundary, and an outer line on the roadway. As illustrated in FIG. 10, specific examples of the lane line include a continuous line LA, a broken line LB, botts' dots (markers, such as stones, placed discontinuously) LC, and a combined line formed of the continuous line LA and the broken line LB combined with each other. Examples of the lane line include a white line and a yellow line.

For example, the taken image is scanned by the image processor 53 in an x direction (coinciding with a lateral direction and a widthwise direction of the own vehicle 8) to extract edge points (x, y) at which an element such as brightness and density changes sharply. For each of all the edge points, Hough transform is performed for a straight line connecting between the edge points, thereby obtaining straight lines on a polar coordinate system. Points at which the straight lines of greater than equal to a set number intersect each other are referred to as "peaks". The peaks are identified, and a straight line on rectangular coordinates which is represented by the peaks is obtained as a candidate for the lane line. The coordinates of the edge point on the lane line obtained as the candidate for the lane line are set as an input value (an observed value), and the Kalman filter is used to estimate information about the own lane S such as the width W of the own lane S and the position of the own vehicle 8 (e.g., an amount of offset (deviation) of the own vehicle 8 from a center line extending through a center of the own lane). For example, as illustrated in FIG. 1, lane lines Y, Z defining the own lane S are detected, and the width W of the own lane S, the position $\Delta x$ of the own vehicle 8, and so on are estimated.

Likewise, the object is detected by processing the taken image representing the object by the image processor 53, extracting the points at which the element such as the brightness and the color changes sharply, and obtaining a boundary line (i.e., an outline) and the like. Techniques such as pattern matching are also used to determine the type of the object (such as a large vehicle and a wall).

The relative-positional-relationship obtainer 52 is configured to obtain a relative positional relationship between the own vehicle 8 and the object detected by the lane-line/object detector 50. In the present embodiment, as illustrated in FIG. 1, a relative positional relationship between the own vehicle 8 and each of objects P, Q is obtained. Examples of the obtained relative positional relationship include: a vehicle-to-object distance L (Lp, Lq); an object-side distance dv (dvp, dvq) between a predetermined reference point Pv in each of the objects P, Q and a corresponding one of the lane lines Y, Z which is nearer to said each of the objects P, Q; and a relative velocity.

The vehicle-to-object distance L is obtained assuming that the own vehicle 8 and each of the objects P, Q are located on the same lane. Also, the vehicle-to-object distance L is obtained as a distance in the front and rear direction between a front portion of the own vehicle 8 and a point on each of the objects P, Q which is nearest to the own vehicle 8 among the points on said each of the objects P, Q. The object-side distance dv takes a positive value when the predetermined reference point Pv in each of the objects P, Q is located outside the own lane S, that is, when the predetermined reference point Pv is located on an opposite side of a corresponding one of the lane lines Y, Z from the own lane S, for example. The object-side distance dv takes a negative value when the predetermined reference point Pv is located in the own lane S, that is, when the predetermined reference point Pv and the own lane S are located on the same side of the corresponding one of the lane lines Y, Z. The distance between the own vehicle 8 and each of the objects P, Q in the lateral direction becomes relatively smaller when the object-side distance dv is small than when the object-side distance dv is large. Thus, it is possible to consider that the object-side distance dv is a physical quantity representing a relative positional relationship between the own vehicle 8 and each of the objects P, Q in the lateral direction.

Since the lane line and the object are detected using, e.g., changes in the brightness and density as described above, this detection is easily affected by environments such as the weather, the brightness, and the light. For example, in the case where the weather is rain, snow, fog, or the like, in the case of nighttime or backlight, or in the case where the own vehicle 8 is running near an exit of a tunnel (that is, an image representing a view outside the tunnel is taken by the camera 40), for example, contrast lowers, and differences in brightness and density become unclear, making it difficult to clearly detect the edge points and the outline. This lowers accuracy of detection of the lane line and the object and lowers positional accuracy of the lane line and the object. Also, in the case where the weather is rain, snow, fog, or the like or in the case of nighttime, for example, an image-taking-area of the camera 40 becomes smaller, which may make it difficult to detect the lane line and the object in a distant area. It is noted that the positional accuracy of the lane line and the object lowers in some cases due to characteristics and a performance capability of the camera 40, for example.

Thus, it is possible to estimate that the positional accuracy of the lane line and the object is low, in the case where the weather is rain, snow, fog, or the like or in the case of nighttime as natural environments, or in the case where the own vehicle 8 is running near the exit of the tunnel or in the case of the backlight (that is, in the case where the own vehicle 8 is running in a state in which a lens of the camera 40 receives light) as running environments, for example. In other words, it is possible to estimate that the positional accuracy of the lane line and the object is low, in the case where the environment satisfies at least one of the above-described conditions (hereinafter may be referred to as "low-positional-accuracy condition").

Furthermore, the positional accuracy of the lane line is affected by the type of the lane line. For example, the positional accuracy is lower in the case where the lane line is the botts' dots LC than in the case where the lane line is the continuous line LA or the broken line LB. For example, due to the smaller number of the edges, an amount of information is smaller in the case of, e.g., the broken line LB and the botts' dots LC than in the case of the continuous line LA, and accordingly the positional accuracy tends to be low in the case of, e.g., the broken line LB and the botts' dots LC. Also, the positional accuracy is in some cases low in the case of the combined line due to difficult recognition, for example. Thus, it is possible to consider that the ranking of the positional accuracy, from the highest to the lowest, is the continuous line LA, the broken line LB, the combined line, and the botts' dots LC, for example. It is possible to consider that the positional accuracy is higher in the case of the white line than in the case of the yellow line, because differences in color, brightness, and so on between the line and a road surface are greater in the case of the white line than in the case of the yellow line. In the present embodiment, in the case of low positional accuracy of the lane line and the object, the relative positional relationship is obtained in a manner described below with consideration of the low positional accuracy.

First, the case of the low positional accuracy of the lane line will be explained. As described above, the object-side distance dv representing the lateral relative positional relationship is a distance between the predetermined reference point Pv in the object and one of the lane lines defining the own lane S, which one is nearer to the object. In the case of the low positional accuracy of the lane line, the accuracy of the object-side distance dv is also low, resulting in low reliability. To solve this problem, in the present embodiment, a limitation distance Lth is obtained based on, e.g., the type of the lane line and the environment, and the object-side distance dv is not obtained for the object in the case where the vehicle-to-object distance L between the own vehicle 8 and the object is greater than the limitation distance Lth. The limitation distance Lth is determined to a shorter one of a type-corresponding limitation distance Ls which is a limitation distance determined based on the type of the lane line and a detection limitation distance Lc which is an actually-detected length of the lane line between the camera 40 and an end of a portion of the lane line which is detected by the camera 40.

$$Lth=\text{MIN}(Ls,Lc)$$

The type-corresponding limitation distance Ls may increase in the order of, from the shortest, a continuous white line, a continuous yellow line, a broken white line, a broken yellow line, the combined line, and the botts' dots, for example. The length of the lane line which is detected by the lane-line/object detector 50 is generally short when the environment satisfies the low-positional-accuracy condition as described above. Accordingly, it is possible to consider that the detection limitation distance is affected by the environment. It is noted that the lane line has disappeared in some cases. Also in these cases, the detection limitation distance is short.

Figure 11:
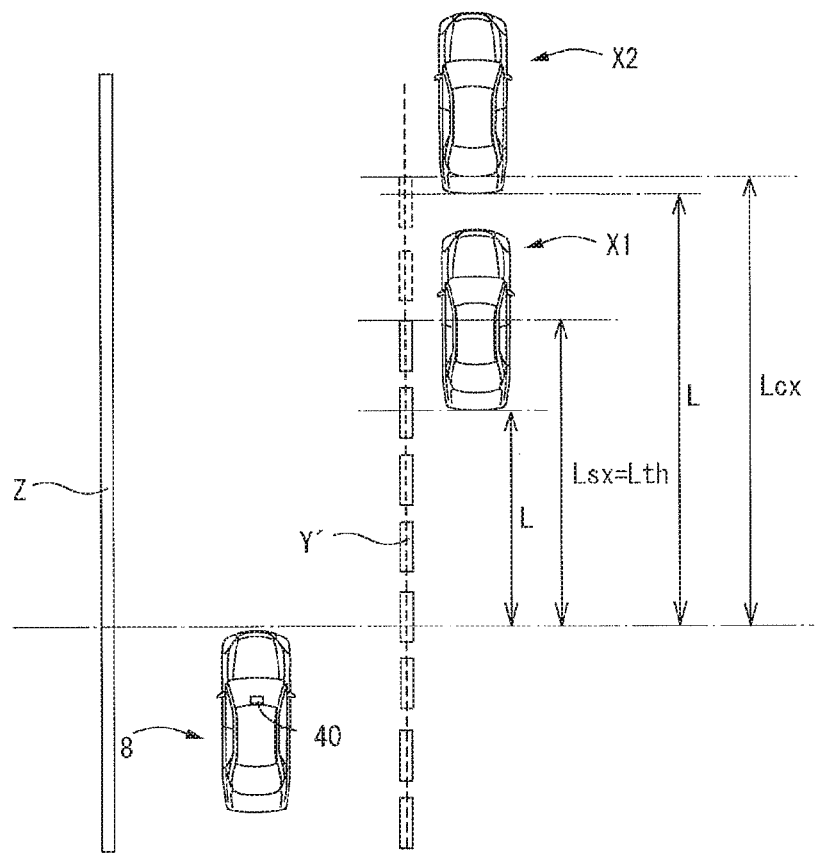
FIG. 11 is a view illustrating a state of a lane line detected by the lane-line/object detector of the driving supporter.

For example, as illustrated in FIG. 11, in the case where the detection limitation distance for a lane line Y' is Lcx, and the type-corresponding limitation distance is Lsx (in the case where the lane line Y' is the broken line LB), the type-corresponding limitation distance Lsx is shorter than the distance Lcx, so that the limitation distance Lth is determined to the type-corresponding limitation distance Lsx. Thus, the object-side distance dv is obtained for an object X1 for which the vehicle-to-object distance L is less than the limitation distance Lth, but the object-side distance dv is not obtained for an object X2 for which the vehicle-to-object distance L is greater than the limitation distance Lth.

Figure 12:
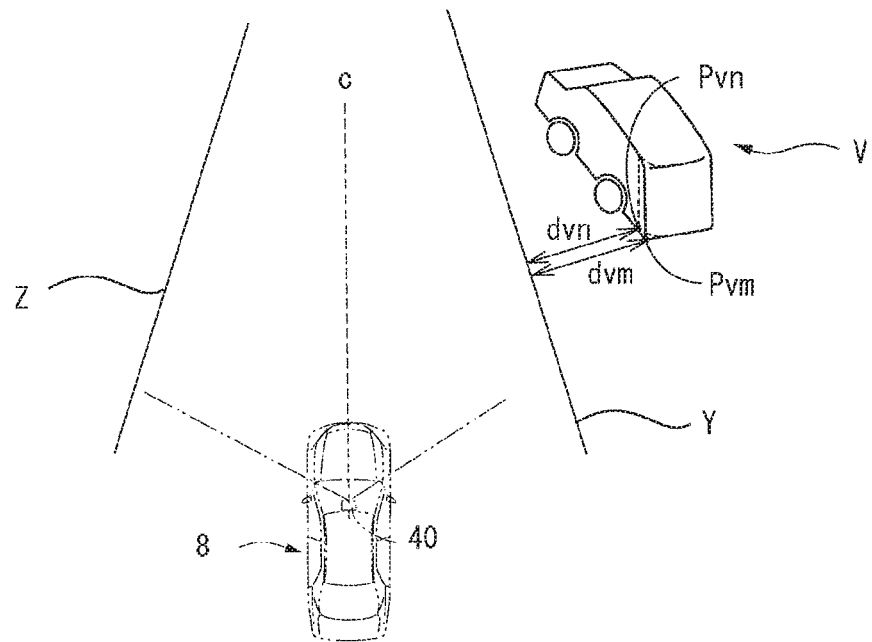
FIG. 12 is a view illustrating a state in which the object-side distance is obtained by the relative-positional-relationship obtainer for an object located outside an own lane.

There will be next explained the case of the low positional accuracy of the object. In the case where the positional accuracy of the object is low, the accuracy of the object-side distance dv is also low. To solve this problem, in the present embodiment, a lateral-relative-positional-relationship corrector 54 is configured to correct the object-side distance dv obtained by the relative-positional-relationship obtainer 52 in the case (i), (ii), or (iii). The case (i) is a case where the relative positional relationship between the own vehicle 8 (the camera 40) and the object is a relationship in which the position of the object cannot be detected with high accuracy due to the characteristics of the monocular camera 40. In this case, the positional accuracy of the object is low. As illustrated in FIG. 12, in the case where an object V is distant from a central axis c of the camera 40 provided on the own vehicle 8 in the lateral direction by a relatively great amount, in other words, in the case where the object V is present outside the own lane S, it is difficult for the camera 40 to clearly identify a boundary line between a side surface of the object V and a front surface or a rear surface of the object V. The reference point Pv is usually provided near the boundary line (a corner) between the side surface and the front surface or the rear surface. Thus, the position of the reference point Pv in the object V is in many cases recognized at a position (Pvn in FIG. 12) nearer to the own vehicle 8 than the actual position (Pvm in FIG. 12), so that the object-side distance dv is in many cases obtained as a value smaller than the actual value (dvn<dvm). To solve this problem, in the present embodiment, in the case where the object V is located outside the own lane S, in other words, in the case where the object V is located outside the lane lines Y, Z defining the own lane S, it is determined that the positional accuracy of the object is less than a set level, and the object-side distance dv is corrected to a larger value. For example, the object-side distance dv is determined to a value obtained by adding a correction value Δsa to the object-side distance dv obtained by the relative-positional-relationship obtainer 52. The correction value Δsa may be referred to as "camera-characteristic-corresponding correction value Δsa".

$$dv=dv+\Delta sa$$

It is noted that the value obtained by adding the correction value Δsa to the object-side distance dv obtained by the relative-positional-relationship obtainer 52 can be referred to as "corrected object-side distance, but there is a low necessity of distinguishment between the corrected object-side distance and the object-side distance, and accordingly the value will be referred to as "object-side distance" without no distinction.

The case (ii) is a case where the environment satisfies the low-positional-accuracy condition. In this case, it is determined that the positional accuracy of the object is less than the set level, and the object-side distance dv is set to a value obtained by adding a correction value Δsb to the object-side distance dv obtained by the relative-positional-relationship obtainer 52. The correction value Δsb may be referred to as "environment-corresponding correction value Δsb".

$$dv=dv+\Delta sb$$

It is noted that information including the weather and information on whether the own vehicle 8 is running near the exit of the tunnel is obtainable based on the navigation information. Whether the camera 40 taken an image against the light may be detected by the camera 40 (e.g., by an image processor in the case where the camera 40 includes the image processor principally constituted by a computer) and may be detected based on a position of the own vehicle 8 on the map, for example.

Figure 9A:
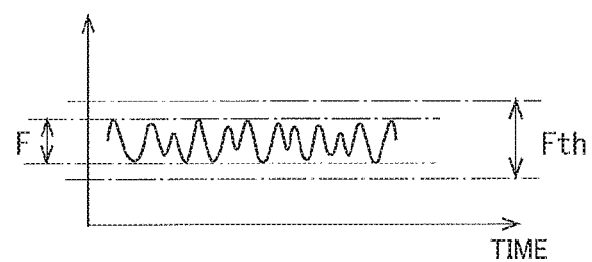
FIG. 9A is a view illustrating a state in which an amplitude of an object-side distance obtained by a relative-positional-relationship obtainer of the driving supporter is small.
Figure 9B:
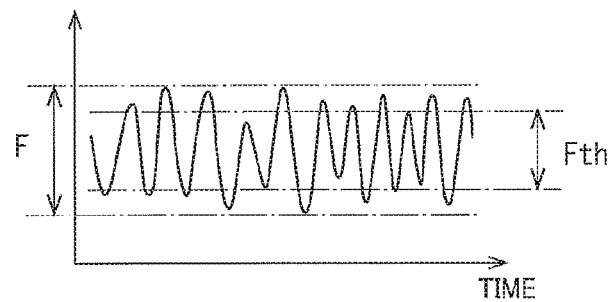
FIG. 9B is a view illustrating a state in which the amplitude of the object-side distance is large.

The case (iii) is a case where an error in the object-side distance dv is large. In this case, it is determined that the positional accuracy of the object is less than the set level due to the performance capability of the camera 40. In the present embodiment, the object-side distance dv obtained by the relative-positional-relationship obtainer 52 is stored at all times, and the amplitude of change in the object-side distance dv is obtained. The amplitude may be a maximum value or an average value during a set length of time. For example, as illustrated in FIG. 9A, when an amplitude F of change in the object-side distance dv is less than or equal to a set value Fth, it is determined that the performance capability of the camera 40 is good and that the positional accuracy of the object is greater than or equal to the set level. In contrast, as illustrated in FIG. 9B, when the amplitude F of change in the object-side distance dv is greater than the set value Fth, it is determined that the performance capability of the camera 40 is bad and that the positional accuracy of the object is less than the set level. In this case, a correction value Δsc is added to the object-side distance obtained by the relative-positional-relationship obtainer 52. The correction value Δsc may be referred to as "camera-error-corresponding correction value Δsc". The camera-error-corresponding correction value Δsc may be a fixed value or a variable value. For example, the camera-error-corresponding correction value Δsc may be a value that is greater when the amplitude of change in the object-side distance dv is large than when the amplitude of change in the object-side distance dv is small.

$$dv=dv+\Delta sc$$

In the present embodiment as described above, when the positional accuracy of the object is less than the set level, a correction value is added to the object-side distance dv obtained by the relative-positional-relationship obtainer 52 to correct the object-side distance dv to a larger value. As will be described below, this processing makes it difficult to determine that the object is a specific object and makes it easy for the LDA control to be executed. It is noted that the correction values $\Delta sa$, $\Delta sb$, $\Delta sc$ may be the same as or different from each other. Each of the correction values $\Delta sa$, $\Delta sb$, $\Delta sc$ may be a fixed value and may be a variable value.

Figure 7:
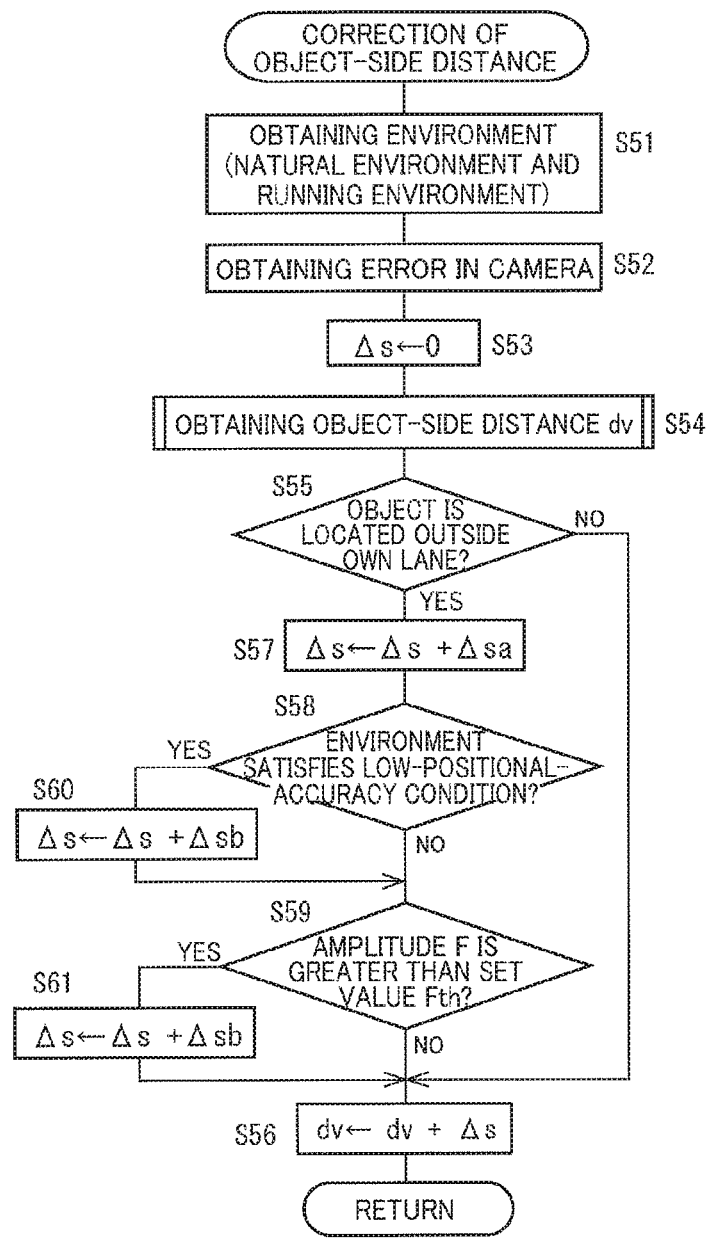
FIG. 7 is a flow chart representing an object-side-distance correction program stored in the storage.

FIG. 7 is a flow chart representing a flow of an object-side-distance obtaining program that is executed for a detected object each time when a predetermined length of time is elapsed. This flow begins with S51 at which the environment (the natural environment and the running environment) is obtained. The amplitude F (see FIG. 9) of the object-side distance dv is obtained at S52. At S53, the correction value $\Delta s$ is set to zero as an initial value.

Figure 8:
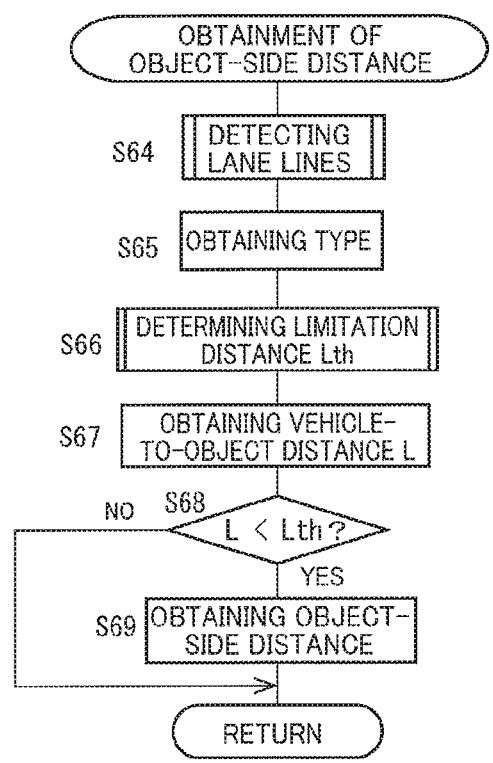
FIG. 8 is a flow chart representing a portion (S54) of the object-side-distance correction program.

At S54, the object-side distance dv is obtained by the relative-positional-relationship obtainer 52. While the relative-positional-relationship obtainer 52 obtains the vehicle-to-object distance L, the object-side distance dv, the relative velocity, and the like as the relative positional relationship, there will be explained obtainment of the object-side distance dv, and explanation of obtainment of the vehicle-to-object distance L and the relative velocity is dispensed with. FIG. 8 is a flow chart representing one example of execution of the processing at S54. This flow begins with S64 at which the lane lines Y, Z defining the own lane S are detected. At S65, the type of each of the lane line is obtained. At S66, a shorter one of (i) the detection limitation distance Lc as the detected length of each of the lane lines Y, Z and (ii) the type-corresponding limitation distance Ls determined based on the type of each of the lane lines is determined to the limitation distance Lth.

$$Lth=\text{MIN}(Lm,Ls)$$

At S67, the vehicle-to-object distance L between the object and the own vehicle 8 is obtained. At S68, the vehicle-to-object distance L and the limitation distance Lth are compared with each other. When the vehicle-to-object distance L is greater than or equal to the limitation distance Lth, the object-side distance dv is not obtained for the object. When the vehicle-to-object distance L is less than the limitation distance Lth, the object-side distance dv is obtained for the object at S69.

At S55, it is determined whether the object is located outside the lane lines Y, Z defining the own lane S, in other words, it is determined whether the object is located outside the own lane S. When the object is located between the lane lines Y, Z, in other words, when the object is located in the own lane S, a negative decision (NO) is made at S55, and this flow goes to S56 at which a value obtained by adding the correction value $\Delta s$ (zero) to the object-side distance dv obtained at S54 is determined as the object-side distance dv and output. There is a low necessity for correcting the object-side distance dv obtained at S54.

$$dvh=dv+\Delta s=dv$$

When a positive decision (YES) is made at S55, the camera-characteristic-corresponding correction value $\Delta sa$ is added to the correction value $\Delta s$ at S57. At S58, it is determined whether the environment satisfies the low-positional-accuracy condition. At S59, it is determined whether the amplitude F is greater than the set value Fth (F>Fth). When negative decisions (NO) are made at S58 and S59, a value obtained by adding the correction value $\Delta s$ (=$\Delta sa$) to the object-side distance dv is at S56 determined as the object-side distance and output.

When the positive decision (YES) is made at S58, the environment-corresponding correction value $\Delta sb$ is added to the correction value $\Delta s$ at S60. When a positive decision (YES) is made at S59, the camera-error-corresponding correction value $\Delta sc$ is added to the correction value $\Delta s$ at S61. For example, when the positive decision (YES) is made at S58, and the negative decision (NO) is made at S59, the correction value $\Delta s$ is determined to the sum of the camera-characteristic-corresponding correction value $\Delta sa$ and the environment-corresponding correction value $\Delta sb$.

$$\Delta s=\Delta sa+\Delta sb$$

The object-side distance dv is determined to a value obtained by adding the correction value $\Delta s$ to the object-side distance dv obtained at S54.

$$dvh=dv+\Delta s=dv+(\Delta sa+\Delta sb)$$

When the negative decision (NO) is made at S58, and the positive decision (YES) is made at S59, the correction value $\Delta s$ is determined to the sum ($\Delta sa+\Delta sc$) of the camera-characteristic-corresponding correction value $\Delta sa$ and the camera-error-corresponding correction value $\Delta sc$. When the positive decisions (YES) are made at S58 and S59, the correction value $\Delta s$ is determined to the sum ($\Delta sa+\Delta sb+\Delta sc$) of the correction values $\Delta sa$, $\Delta sb$, $\Delta sc$. The object-side distance dv is determined to a value obtained by adding the correction value $\Delta s$ to the object-side distance dv.

It is noted that the correction value $\Delta s$ may be determined by multiplying weights ($\gamma a$, $\gamma b$, $\gamma c$) by the camera-characteristic-corresponding correction value $\Delta sa$, the environment-corresponding correction value $\Delta sb$, and the camera-error-corresponding correction value $\Delta sc$. For example, the correction value $\Delta s$ may be calculated according to the following expression:

$$\Delta s=\gamma a \cdot \Delta sa+\gamma b \cdot \Delta sb+\gamma c \cdot \Delta sc$$

The camera-error-corresponding correction value $\Delta sc$ may be set to a larger value when the amplitude F is large than the amplitude F is small. The environment-corresponding correction value $\Delta sb$ may be set to a value determined in accordance with the environment (e.g., a value that is greater in the case of fog than in the case of rain).

In the present embodiment, in the case where the vehicle-to-object distance L is less than or equal to a set vehicle-to-object distance Lth, and the object-side distance dv is less than or equal to a first set object-side distance dvth1 (a positive value), and an approach speed SV as the relative velocity is greater than or equal to a set approach speed SVth, it is determined that the relative positional relationship between the object and the own vehicle 8, such as the object-side distance obtained as described above, is a predetermined specific relationship, and the object is set as a specific object. In other words, in the case where the relative positional relationship between the own vehicle 8 and the object is a set relationship in which it is estimated that a steering operation is to be performed in a direction in which the own vehicle 8 avoids the object, the object is set as the specific object.

When the object-side distance dv is short, the driver more easily feels a high necessity for the own vehicle 8 to avoid the object, than when the object-side distance dv is long. The first set object-side distance dvth1 may be set to such a distance that it is estimated that the steering operation in the direction in which the own vehicle 8 avoids the object is to be performed by the driver. It is known that the first set object-side distance dvth1 is about 30 cm in general.

It is possible to consider that the driver has a higher necessity of performing the steering operation in the direction in which the own vehicle 8 avoids the specific object, when the vehicle-to-object distance is short, and the approach velocity is high than when the vehicle-to-object distance is long, and the approach velocity is low. Thus, each of the set vehicle-to-object distance Lth and the set approach velocity SVth may be set to such a value that it is considered that there is a high necessity for the driver to perform the steering operation in the direction in which the own vehicle 8 avoids the specific object, for example. For example, it is known that the set vehicle-to-object distance and the set approach velocity are about 50 m and about 30 km/h, respectively, in general.

When the object-side distance dv is greater than or equal to a second set object-side distance dvth2 (a negative value), it is determined that the object is present on a front right side or a front left side of the own vehicle 8. The case where the object-side distance dv is less than or equal to the first set object-side distance dvth1 includes a case where at least a portion of the object is located in the own lane. However, in the case where the entire object is located substantially in front of the own vehicle 8 in the own lane, it is difficult to determine whether the object is located on a front right side or a front left side of the own vehicle 8, and it is difficult to determine whether the steering operation for avoiding the object is to be performed in the right direction or the left direction. To overcome this problem, in the present embodiment, when the object-side distance dv is greater than or equal to the second set object-side distance dvth2, it is determined that the object is present on a front right side or a front left side of the own vehicle 8. It is noted that the second set object-side distance dvth2 may be about −50 cm in general.

Figure 6:
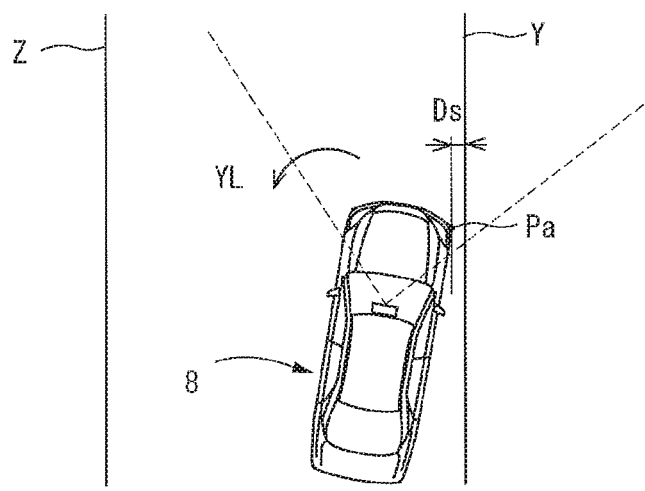
FIG. 6 is a view illustrating an own-vehicle-side distance.

The LDA controller 46 is configured to execute the LDA control for driving support to prevent a departure of the own vehicle 8 from the lane. As illustrated in FIG. 6, when an own-vehicle-side distance Ds that is a shorter one of a distance between a predetermined reference point Pa in the own vehicle 8 and the lane line Y defining the own lane S and a distance between the reference point Pa and the lane line Z defining the own lane S is less than a start threshold value Dsa in a state in which a cancel flag is OFF, and execution of the LDA control is permitted, it is determined that the possibility of the departure of the own vehicle 8 is high, and the LDA control is started. In the LDA control, steering torque in a direction YL in which the own-vehicle-side distance Ds increases is applied. The magnitude of the applied steering torque is larger when the own-vehicle-side distance Ds is small than when the own-vehicle-side distance Ds is large. When the own-vehicle-side distance Ds exceeds an end threshold value Dsb, it is determined that the possibility of the departure of the own vehicle 8 has become low, and the LDA control is terminated. The own-vehicle-side distance Ds is one example of a value representing the possibility of the departure, and it is determined that the possibility of the departure is higher when the own-vehicle-side distance Ds is short than when the own-vehicle-side distance Ds is long.

Figure 5:
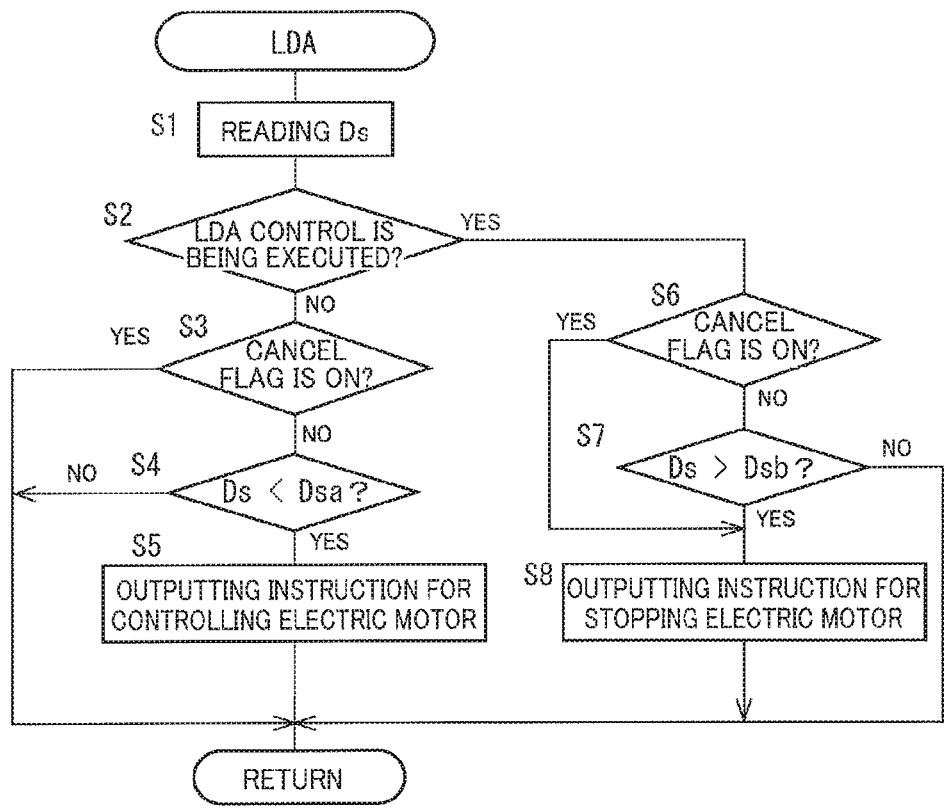
FIG. 5 is a flow chart representing a procedure of a lane-departure-alert (LDA) control program stored in the storage.

The LDA control is executed by executing the LDA control program. FIG. 5 is a flow chart representing a flow of the LDA control program. The LDA control program is executed in a cycle of a predetermined time. This flow begins with S1 at which the own-vehicle-side distance Ds and other values are read. It is determined at S2 whether the LDA control is being executed. When the LDA control is not being executed, it is determined at S3 whether the cancel flag is ON. When the cancel flag is OFF, it is determined at S4 whether the own-vehicle-side distance Ds is less than the start threshold value Dsa. When the own-vehicle-side distance Ds is less than the start threshold value Dsa, and the possibility of the departure is high, an instruction for starting the LDA control is output at S5. The steering ECU 12 controls the electric motor 21 to support driving by applying steering torque in a direction in which the own-vehicle-side distance Ds is increased. When the cancel flag is ON, a positive decision (YES) is made at S3, and the processings at S4 and S5 are not executed. Start of the LDA control is inhibited regardless of the value of the own-vehicle-side distance Ds.

When the LDA control is being executed, a positive decision (YES) is made at S2, and it is determined at S6 whether the cancel flag is ON. When the cancel flag is OFF, it is determined at S7 whether the own-vehicle-side distance Ds is greater than the end threshold value Dsb. When the own-vehicle-side distance Ds is less than or equal to the end threshold value Dsb, it is considered that there is a possibility of the departure. Thus, a negative decision (NO) is made at S7, and the processings at S1, S2, S6, and S7 are repeated to continue the LDA control. When the own-vehicle-side distance Ds becomes greater than the end threshold value Dsb, the steering ECU 12 at S8 outputs an instruction for stopping control of the electric motor 21 for the LDA. The electric motor 21 is stopped in the steering system 20 to terminate the control of the electric motor 21 for the LDA. When the cancel flag is ON, a positive decision (YES) is made at S6. In this case, the instruction for stopping the control of the electric motor 21 for the LDA is output at S8 without execution of the processing at S7. Even when the own-vehicle-side distance Ds is less than or equal to the end threshold value Dsb, the LDA control is terminated.

When an inhibiting condition is satisfied, for example, when the steering torque Ts is greater than a threshold value Tsth, the LDA control inhibitor 48 sets the cancel flag to ON to inhibit the LDA controller 46 from executing the LDA control. The threshold value Tsth is determined by a threshold-value determiner 56. For example, it is determined that the inhibiting condition is satisfied, and the cancel flag is set to ON, when at least one of the following cases is satisfied: a case where the steering torque Ts detected by the steering-torque sensor 26 is greater than the cancel threshold value Tsth; a case where the direction indicating switch 16 is ON; a case where the hazard-lamp switch 18 is ON; and a case where the central axis c of the camera 40 has not been learned yet, in other words, the time of the determination of the threshold value is before the learning of the central axis c of the camera 40.

When the absolute value of the steering torque Ts is greater than the threshold value Tsth, it is estimated that the driver intends to depart from the own lane S by changing the lane or bringing the own vehicle 8 to one side for parking, for example. Thus, when the steering torque Ts is greater than the threshold value Tsth, execution of the LDA control is not preferable. Furthermore, it is also estimated that the absolute value of the steering torque Ts becomes greater than the threshold value Tsth, when the steering operation in the direction in which the own vehicle 8 avoids the specific object is performed. The same operations are performed for the cases of the direction indicating switch 16 and the hazard-lamp switch 18.

Figure 13:
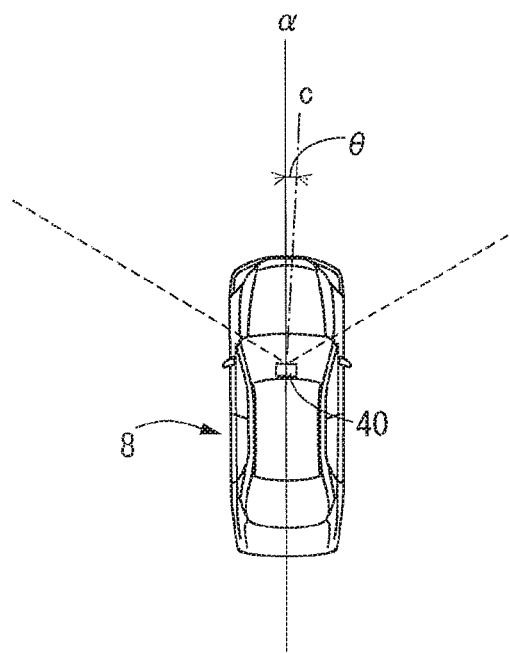
FIG. 13 is a view illustrating an inclination of a reference axis of a camera of the lane-line/object detector with respect to a front and rear direction of the own vehicle.

There will be next explained the case where the central axis c of the camera 40 has not been learned yet. The camera 40 is in most cases installed in a state in which the central axis c of the lens as a reference line coincides with a front-rear line a extending in the front and rear direction of the own vehicle 8, i.e., the longitudinal direction of the own vehicle 8. As illustrated in FIG. 13, however, the central axis c is in some cases displaced from the front-rear line a due to an error in installation of the camera 40, distortion of a vehicle body, and a state in which wheels are mounted on the vehicle body of the wheel. It is difficult to accurately detect the relative positional relationship between the own vehicle 8 and the object in the state in which the central axis c deviates from the front-rear line α. A deviation angle θ between the central axis c and the front-rear line α is obtained at a predetermined timing, e.g., a case where the ignition switch 17 is switched from OFF to ON. This obtainment of the deviation angle θ may be hereinafter referred to as "learning". The LDA control is inhibited before the deviation angle θ is obtained. It is not essential to inhibit the LDA control before learning of the deviation angle θ, and the LDA control may be suppressed by, for example, making it difficult to start the LDA control or moderating the LDA control (for example, reducing the steering torque to be applied in the case of the same own-vehicle-side distance Ds).

Figure 3:
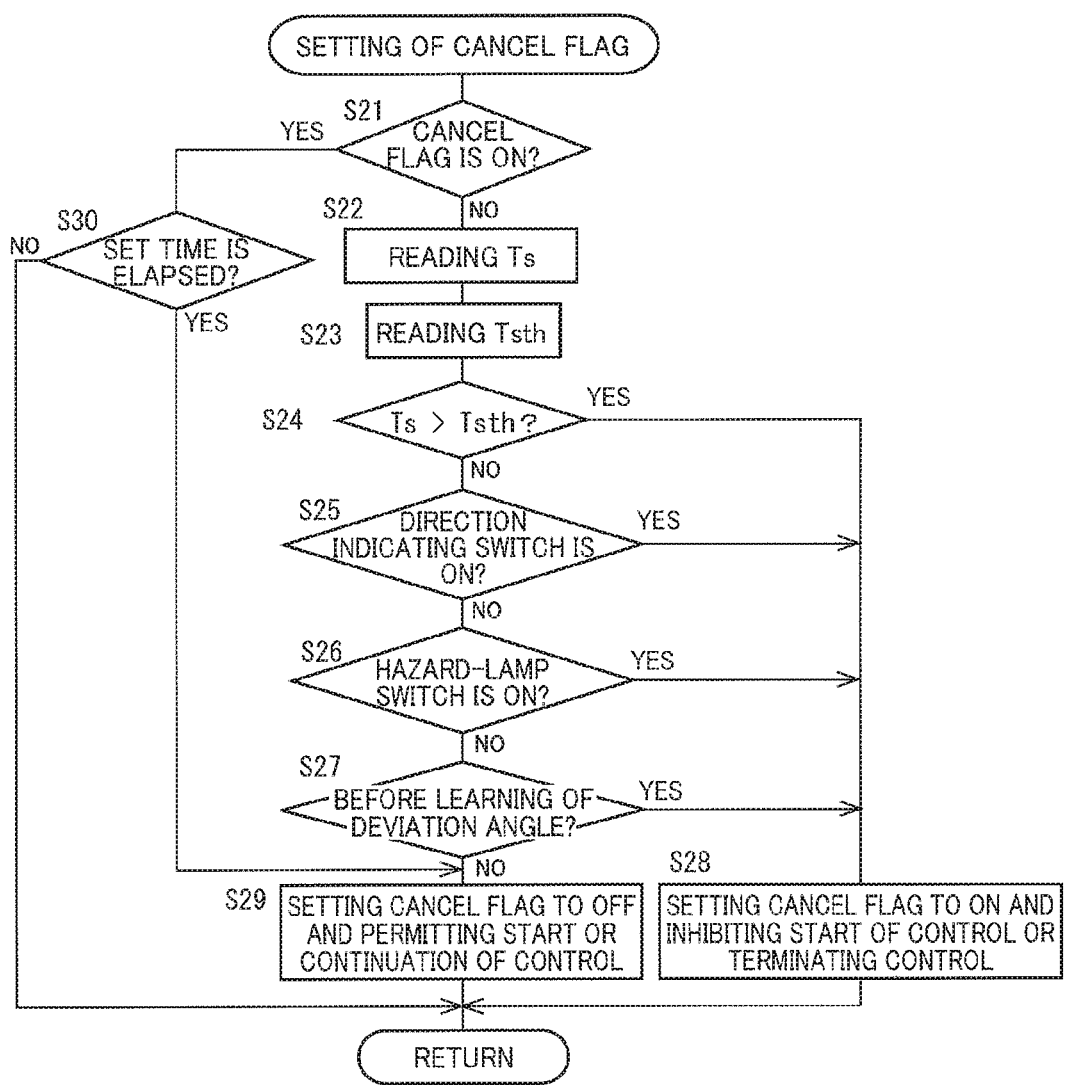
FIG. 3 is a flow chart representing a procedure of a cancel-flag setting program stored in a storage of a driving support ECU of the own vehicle.

The cancel flag is determined by execution of a cancel-flag setting program. FIG. 3 is a flow chart representing a flow of the cancel-flag setting program. This flow begins with S21 at which it is determined whether the cancel flag is ON. When the cancel flag is OFF, the steering torque Ts is read at S22. The threshold value Tsth which will be described below is read at S23. It is determined at S24 whether the steering torque Ts is greater than the threshold value Tsth. It is determined at S25 whether the direction indicating switch 16 is ON. It is determined at S26 whether the hazard-lamp switch 18 is ON. It is determined at S27 whether the current time is before learning of the deviation angle θ. When a positive decision (YES) is made at at least one of the processings at S24-S27, the cancel flag is turned to ON at S28 to inhibit the LDA control. When negative decisions (NO) are made at S24-S27, the cancel flag is turned to OFF at S29.

When the cancel flag is ON, it is determined at S30 whether a set length of time is elapsed. Before the set length of time is elapsed, the processings at S21 and S30 are repeated. When the set length of time is elapsed, a positive decision (YES) is made at S30, and the cancel flag is set to OFF at S29. Thus, the cancel flag is turned to ON and then to OFF in the set length of time. This is because it is not preferable that a state in which the cancel flag is ON, i.e., a state in which the LDA control is inhibited continues for a long time.

The threshold-value determiner 56 is configured to determine the threshold value Tsth. This determination will be explained assuming that the objects P, Q in FIG. 1 are the specific objects.

In the case where neither of the specific objects P, Q is present, in other words, in the case where the specific object is absent on a front right side or a front left side of the own vehicle 8, the threshold value Tsth is set to a threshold value A. The threshold value A may be a value which enables clear recognition of the presence of driver's intention of operating the own vehicle 8 so as to depart from the lane, for example, driver's intention of changing the lane or bringing the own vehicle 8 to an outside of the lane for parking. The threshold value A is determined to a default value in some cases.

In the case where the specific object P or Q is present, in other words, in the case where the specific object is present on a front right side or a front left side of the own vehicle 8, the threshold value Tsth is determined to a value B (A>B) that is less than the threshold value A to which the threshold value Tsth is determined in the case where neither of the specific objects P, Q is present. For example, in the case where the specific object P is present, and the specific object Q is absent, the own vehicle 8 may run along a path VL (see FIG. 1) away from the specific object P by a leftward steering operation performed by the driver. When the LDA control is executed in this case, a rightward steering torque indicated by arrow YR is applied to the steering mechanism. Since the direction (left) of the steering operation performed by the driver is reverse to the direction of the steering torque applied to the steering mechanism, discomfort is given to the driver. To solve this problem, in the present embodiment, in the case where the specific object P is present, the threshold value Tsth is determined to a threshold value B less than the threshold value A (A>B). Thus, the LDA control is in some cases inhibited even when the steering torque produced by the steering operation performed by the driver for bringing the own vehicle 8 away from the specific object is less than the threshold value A. This makes it difficult for the LDA control to be executed, leading to reduced driver's discomfort. The same processing and effects are executed and achieved in the case where the specific object Q is present, and the specific object P is absent.

In the case where both of the specific object P and the specific object Q are present, in other words, in the case where the specific objects are present on a front right side and a front left side of the own vehicle 8, the threshold value Tsth is determined to the value A greater than the value B to which the threshold value Tsth is determined in the case where the specific object P or Q is present. For example, in the case where rightward steering torque is applied to the steering mechanism in the LDA control executed when the steering operation is performed in the left direction by the driver to avoid the specific object P, the direction of the steering torque coincides with the direction of the steering operation performed by the driver to avoid the specific object Q. Thus, the LDA control is preferably executed. When the LDA control is not executed, on the contrary, discomfort is given to the driver in some cases. Thus, the threshold value is determined to the value A greater than the value B to which the threshold value is determined in the case where the specific object P or Q is present.

In the case where the specific object is present in front of the own vehicle 8 though not illustrated, it is estimated that the driver is to perform the steering operation in the right or left direction to operate the own vehicle 8 to avoid the specific object. In this case, in the case where there is no specific object on a front right side or a front left side of the own vehicle 8, it is preferable to make it difficult for the LDA control to be executed. Thus, the threshold value Tsth is determined to the threshold value B. In the case where the specific object is present in front of the own vehicle 8, and another specific object is present on at least one of a front right side and a front left side of the own vehicle 8, it is preferable to make it easier for the LDA control to be executed. Thus, the threshold value Tsth is determined to the threshold value A.

Figure 4:
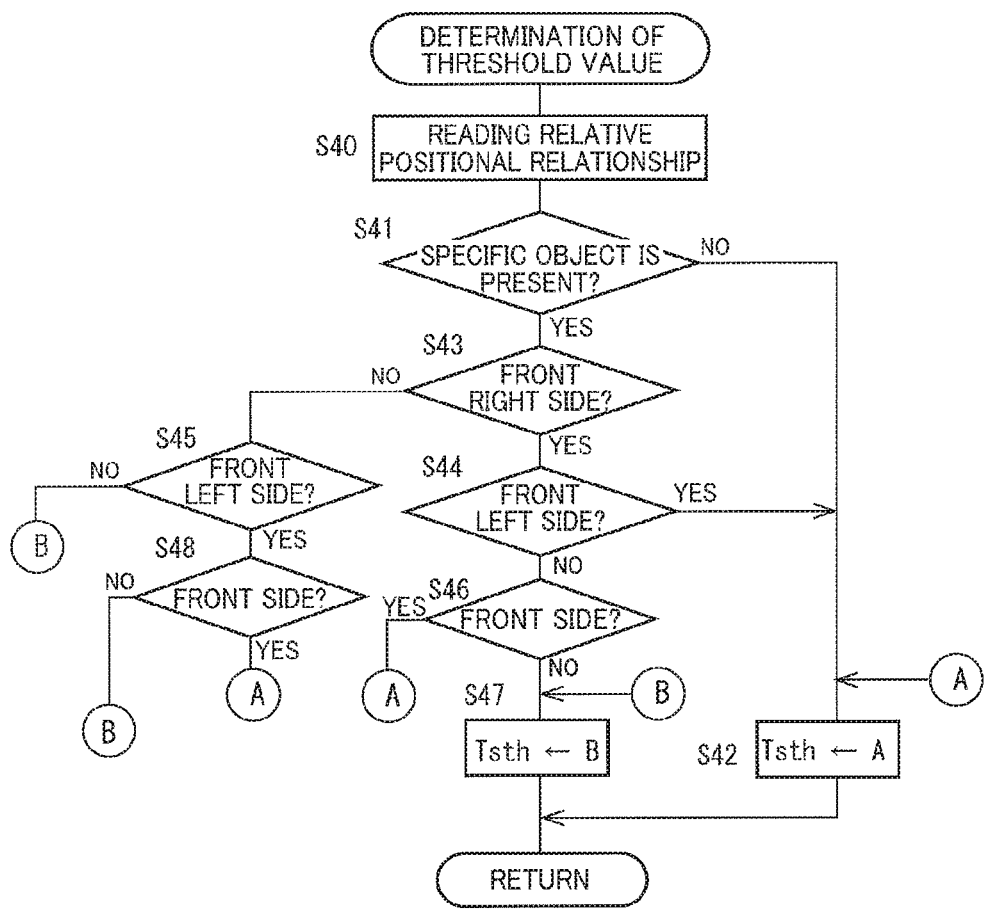
FIG. 4 is a flow chart representing a procedure of a threshold-value determination program stored in the storage.

FIG. 4 is a flow chart representing a flow of a threshold-value determination program for determining the threshold value Tsth. This flow begins with S40 at which the relative positional relationship (e.g., the corrected relative positional relationship) is read. It is determined at S41 whether the specific object is present. When a negative decision (NO) is made at S41, the threshold value Tsth is determined to the threshold value A at S42. When a positive decision (YES) is made at S41, it is determined at S43-S48 whether the specific object is present on a front right side of the own vehicle 8, whether the specific object is present on a front left side of the own vehicle 8, and whether the specific object is present in front of the own vehicle 8. When the specific object is present on one of a front right side and a front left side of the own vehicle 8 and absent in front of the own vehicle 8 (when a positive decision (YES) is made at S43, a negative decision (NO) is made at S44, and a negative decision (NO) is made at S46 or when a negative decision (NO) is made at S43, a positive decision (YES) is made at S45, and a negative decision (NO) is made at S48), the threshold value Tsth is determined to the threshold value B at S47. When the specific objects are present on a front right side and a front left side of the own vehicle 8, positive decisions (YES) are made at S43 and S44, and the threshold value Tsth is determined to the threshold value A at S42. In this case, the threshold value Tsth is determined to the threshold value A, regardless of the presence of the specific object in front of the own vehicle 8. When the specific object is present in front of the own vehicle 8 but absent on a front right side or a front left side of the own vehicle 8 (when the negative decision (NO) is made at S43, and a negative decision (NO) is made at S45), the threshold value Tsth is determined to the threshold value B at S47. When the specific object is present in front of the own vehicle 8, and another specific object is present on a front right side or a front left side of the own vehicle 8 (when the positive decision (YES) is made at S43, the negative decision (NO) is made at S44, and a positive decision (YES) is made at S46 or when the negative decision (NO) is made at S43, the positive decision (YES) is made at S45, and a positive decision (YES) is made at S48), the threshold value Tsth is determined to the threshold value A at S42.

In the present embodiment as described above, the threshold value Tsth is determined to the threshold value B when the specific object is present in front of the own vehicle 8 or on a front right side or a front left side of the own vehicle 8. Also, the threshold value Tsth is determined to the threshold value A when the specific objects are present on a front right side and a front left side of the own vehicle 8 or when the specific objects are present in front of the own vehicle 8 and on at least one of a front right side and a front left side of the own vehicle 8. These processings reduce discomfort given to the driver and enable appropriate driving support.

In the present embodiment, in the case where the objects P, Q illustrated in FIG. 1 are the specific objects, one of the objects P, Q (the object P, for example) is one example of a first object, and the other (the object Q, for example) is one example of a second object. A relative positional relationship between the object P and the own vehicle 8 is one example of a first relationship. A relative positional relationship between the object Q and the own vehicle 8 is one example of a second relationship. The left direction is one example of a first direction. The right direction is one example of a second direction. The object-side distance is one example of a value representing the lateral relative positional relationship. The first set object-side distance dvth1 is one example of a set value.

The driving supporter is constituted by devices including the steering system 20, the driving support ECU 10, and the camera 40. A lateral-relationship obtainer is constituted by the relative-positional-relationship obtainer 52 and portions of the driving support ECU 10 which store and execute the processing at S54, for example. A lateral-relationship corrector is constituted by the lateral-relative-positional-relationship corrector 54 and portions of the driving support ECU 10 which store and execute the processings at S55-S61, for example. The central axis of the camera 40 is one example of a reference axis. A driving support suppressor is constituted by portions of the driving support ECU 10 which store and execute the processings at S27, S28, S3, S6, and S8, for example. A threshold-value determiner is constituted by portions of the driving support ECU 10 which store and execute the threshold-value determination program, for example. The lane-line/object detector 50 is one example of each of a lane-line detector and an object detector, for example. The camera 40 is one example of an image taking device, for example. A first object detector is constituted by the situation obtainer 42 and portions of the driving support ECU 10 which store and execute the processings at S41 and S43. A second object detector is constituted by portions of the driving support ECU 10 which store and execute the processings at S41, S44, and S45.

The lane-line/object detector 50 and the relative-positional-relationship obtainer 52 may be formed integrally with each other. The image processor 53 may be installed in the camera 40. While the situation in the region Rf is obtained based on the image taken by the camera 40 in the above-described embodiment, the driving supporter may be configured such that a radar device is provided, and the situation in the region Rf is obtained based on, e.g., reflected waves of electromagnetic waves emitted from the radar device and may be configured such that the situation in the region Rf is obtained based on both of the radar device and the camera, for example. It is noted that an area in which the object and the like are obtainable by the radar device may be different from an area in which the object and the like are obtainable by the camera. The driving supporter may further include a notifying device configured to provide notification indicating a high possibility of a departure of the own vehicle 8 from the lane.

Second Embodiment

It is noted that the threshold value may be determined based on a necessity for the driver to perform avoidance steering (noted that this necessity is felt by the driver). For example, the threshold value may be determined to a value that is less in the case where the necessity for the driver to perform the avoidance steering is high due to the type, the size, and/or behavior of the specific object than in the case where the necessity for the driver to perform the avoidance steering is not high. If the objects P, Q illustrated in FIG. 1 are the specific objects, one of the objects P, Q corresponds to the first object, and the other corresponds to the second object, and the threshold value is determined based on the types, the sizes, and behavior of the first object and the second object.

For example, in the case where the specific object is a large vehicle or a high and long wall (i.e., a wall having a height greater than or equal to a set height and having a length greater than or equal to a set length), the driver feels a strong sense of oppression and feels a high necessity of the avoidance steering. In the case where the behavior of the specific object is unstable, for example, in the case where the hazard lamps of the specific object light up, in the case where ON and OFF states of brake lamps of the specific object are repeated frequently, in the case where ON and OFF states of turn-signal lamps of the specific are repeated, or in the case where positions of rear position lamps of the specific object frequently change, the driver feels danger and feels a high necessity of the avoidance steering. In the case where a lateral speed that is a lateral component of a speed at which the specific object approaches the own vehicle 8 is greater than or equal to a set speed, the driver strongly desires to bring the own vehicle 8 away from the specific object and feels a high necessity of the steering operation for operating the own vehicle 8 to avoid the object. Thus, in the present embodiment, in the case where the specific object is present on one of a front right side, a front left side, and a front side of the own vehicle 8, the threshold value is determined to a small value in the case where the specific object gives a sense of oppression to the driver, in the case where behavior of the specific object is unstable, or in the case where the lateral speed of the specific object is greater than or equal to the set speed (this case may be included in the case where the behavior is unstable), for example. It is noted that the set height and the set length may be respectively set to a height and a length which may give a sense of oppression to the driver. One example of the specific object having the set height and the set length is a sound-proof wall provided on an expressway. The set speed may be a speed that gives the driver a strong demand for operating the own vehicle 8 to avoid the specific object.

Figure 14:
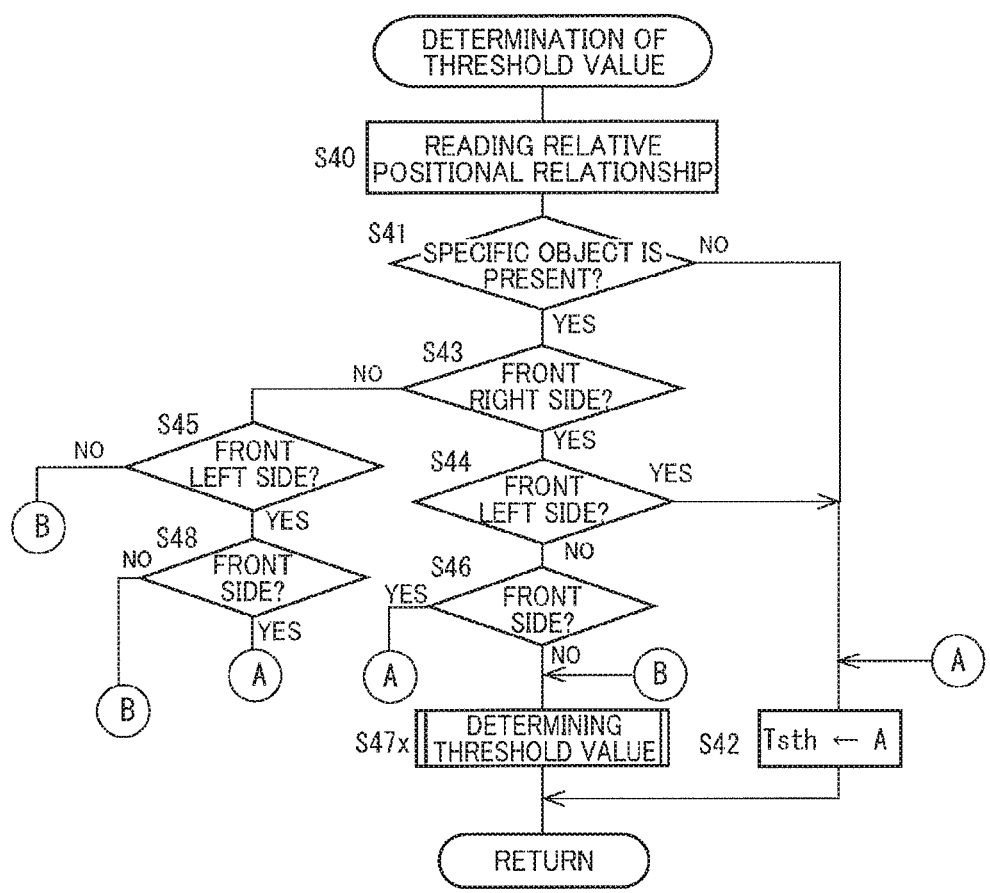
FIG. 14 is a flow chart representing a threshold-value determination program stored in a storage of a driving supporter according to a second embodiment.

FIG. 14 is a flow chart representing a flow of a threshold-value determination program. In the present second embodiment, the threshold-value determination program in FIG. 14 is executed each time when a set length of time is elapsed. It is noted that the same step numbers as used in the threshold-value determination program in FIG. 4 in the first embodiment are used to designate the corresponding processings in the flow chart in FIG. 14, and an explanation of which is dispensed with. In the case where the specific objects are present on a front right side and a front left side of the own vehicle 8 or in the case where the specific object is present in front of the own vehicle 8 and on one of a front right side and a front left side of the own vehicle 8, as in the case in the first embodiment, the threshold value Tsth is determined to the value A at S42. In the case where the specific object is present on one of a front side, a front right side, and a front left side of the own vehicle 8, the threshold value is at S47x determined based on the type, the size, and behavior of the specific object.

Figure 15:
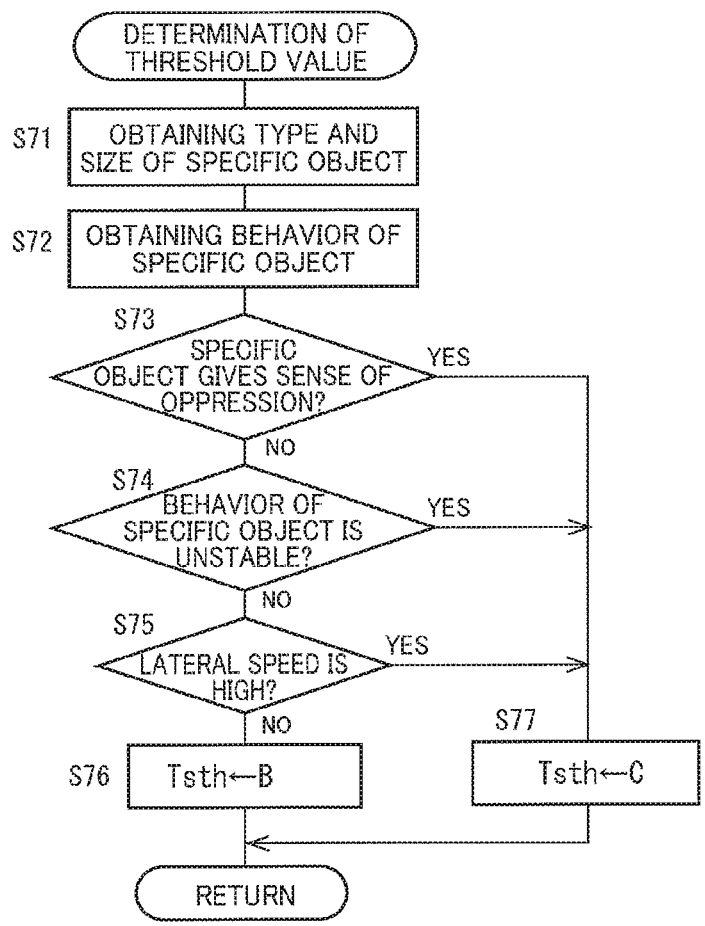
FIG. 15 is a flow chart representing a portion (S68) of the threshold-value determination program.

FIG. 15 is a flow chart representing one example of execution of the processing at S47x. This flow begins with S71 at which the type and the size of the specific object are obtained. At S72, behavior of the specific object is obtained. It is determined at S73 whether the specific object gives a sense of oppression. It is determined at S74 whether behavior of the specific object is unstable. It is determined at S75 whether the lateral speed is greater than or equal to the set speed. When negative decisions (NO) are made at S73-S75, the threshold value Tsth is determined to the value B at S76. When a positive decision (YES) is made at one of S73-S75, the threshold value Tsth is at S77 determined to a value C less than the threshold value B. Thus, in the case where the driver feels a high necessity of the steering operation, the threshold value Tsth is determined to the value C less than the value B. This processing further makes it difficult for the LDA control to be executed, resulting in reduced discomfort given to the driver.

In the present embodiment, an object-shape obtainer is constituted by portions of the driving support ECU 10 which store and execute the processing at S71, for example. A behavior obtainer and a lateral-speed obtainer are constituted by portions of the driving support ECU 10 which store and execute the processing at S72, for example.

In the above-described embodiments, the case where the specific object is present on one of a front side, a front right side, and a front left side of the own vehicle 8 has been explained. However, in the case where the specific objects are present on a front right side and a front left side of the own vehicle 8, when a positive decision (YES) is made at at least one of S73-S75 for at least one of the specific objects located on a front right side and a front left side of the own vehicle 8, the threshold value Tsth may be determined to a value less than the threshold value A (e.g., the threshold value B or an intermediate value between the threshold value A and the threshold value B).

Third Embodiment

The threshold value may be determined to a value that is greater in the case where the driver feels a strong demand for prevention of departure of the own vehicle 8 from the lane than in the case where the driver does not feel a strong demand for prevention of departure of the own vehicle 8 from the lane. In the case where the width of the own lane S is small or in the case where a traffic volume is large, it is estimated that the driver feels a strong demand for prevention of departure of the own vehicle 8 from the lane, when compared with the case where the width of the own lane S is large or the case where a traffic volume is small. The width of the own lane S may be obtained by the situation obtainer 42 and may be obtained based on the navigation information. For example, it is possible to determine that the width of the own lane S is small, when the width of the own lane S is less than a set value. It may be determined that the width of the own lane S is small in the case where the own lane S is a road in an urban area, and it may be determined that the width of the own lane S is large in the case where the own lane S is an expressway. The traffic volume may be obtained based on the navigation information. For example, it may be determined that the traffic volume is large in the case where traffic information indicates a traffic jam or in the case of a road in an urban area. Also, it may be determined that the traffic volume is large in the case where the vehicle-to-object distance is less than or equal to a set distance. In the present embodiment, the threshold value is determined based on, e.g., a traffic volume and the width of the own lane S, regardless of the presence or absence of the specific object.

Figure 16:
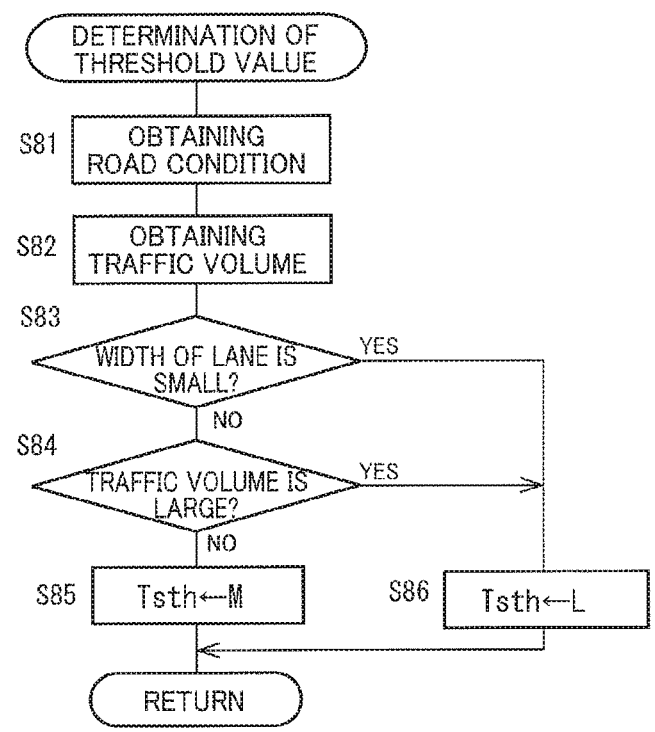
FIG. 16 is a flow chart representing a threshold-value determination program stored in a storage of a driving supporter according to a third embodiment.

FIG. 16 is a flow chart representing a flow of determination of the threshold value in the third embodiment. This flow begins with S81 at which the width W of the own lane S is obtained. At S82, a traffic volume is obtained based on the navigation information. It is determined at S83 whether the width of the own lane S is small. It is determined at S84 whether the traffic volume is large. When negative decisions (NO) are made at S83 and S84, it is determined that the demand for prevention of the departure is not strong, and the threshold value is set to a normal value M at S85. When a positive decision (YES) is made at at least one of S83 and S84, it is determined that the driver has a strong demand for prevention of the departure of the own vehicle 8 from the own lane S, and the threshold value is set to a large value L at S86. Thus, in the present embodiment, in the case where the driver has a strong demand for prevention of the departure, the threshold value is set to the large value. This processing makes it easy for the LDA control to be executed, thereby enabling appropriate execution of the LDA control.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

CLAIMABLE INVENTIONS

There will be described claimable inventions in the following forms.

(1) A driving supporter configured to perform support of driving such that an own vehicle drives within a lane, the driving supporter comprising:

an image taking device configured to take an image representing a view in an area;

a situation obtainer configured to detect an object based on the image taken by the image taking device, the situation obtainer being configured to obtain a relative positional relationship between the object and the own vehicle; and a support inhibitor configured to inhibit the support of the driving when a steering-operation value representing a magnitude of a steering operation performed by a driver is greater than a threshold value, wherein the support inhibitor comprises a threshold-value determiner configured to determine the threshold value to a value that is greater when a first object and a second object different from the first object are present than when the first object is present, and the second object is absent, wherein the first object has a first relationship in which the relative positional relationship obtained by the situation obtainer is a relationship in which it is estimated that a steering operation is to be performed in a first direction in which the own vehicle avoids the object, and wherein the second object has a second relationship in which the relative positional relationship is a relationship in which it is estimated that the steering operation is to be performed in a second direction reverse to the first direction such that the own vehicle avoids the object.

The first object is detected by a first object detector, and the second object is detected by a second object detector.

(2) The driving supporter according to the above form (1), wherein the situation obtainer comprises:

a lateral-relationship obtainer configured to obtain a lateral relative positional relationship between the own vehicle and the object detected based on the image taken by the image taking device; and a lateral-relationship corrector configured to, when a positional accuracy of the object is less than a set level, correct the lateral relative positional relationship obtained by the lateral-relationship obtainer, to a relationship in which the object and the own vehicle are farther from each other in a lateral direction.

The area the image taking device is capable of shooting is determined depending upon, e.g., a position and a performance capability of the image taking device. For example, the shootable area may be a front side and front lateral sides of the own vehicle.

(3) The driving supporter according to the above form (2), wherein the situation obtainer comprises an image processor configured to process the image taken by the image taking device, and the situation obtainer is configured to detect the object by processing of the taken image by the image processor.

(4) The driving supporter according to the above form (2) or (3), wherein the lateral-relationship corrector is configured to determine that the positional accuracy of the object is less than the set level and correct the lateral relative positional relationship obtained by the lateral-relationship obtainer, to the relationship in which the object and the own vehicle are farther from each other in the lateral direction, when the object detected based on the image taken by the image taking device is located outside an own lane on which the own vehicle is running.

In the case where the relative positional relationship between the own vehicle and the object is a relationship in which a distance between the own vehicle (a reference line of the image taking device) and the object in the lateral direction is greater than or equal to a set distance, characteristics of the image taking device may lower the positional accuracy of the object. In the driving supporter according to this form, in the case where the object detected based on the taken image is located outside the own lane, i.e., outside lane lines defining the own lane, the distance between the object and the own vehicle in the lateral direction is greater than or equal to the set distance, and it is estimated that the positional accuracy of the object is less than the set level.

(5) The driving supporter according to any one of the above forms (2) through (4), wherein the lateral-relationship corrector is configured to determine that the positional accuracy of the object is less than the set level and correct the lateral relative positional relationship between the object and the own vehicle, to the relationship in which the object and the own vehicle are farther from each other in the lateral direction, when an environment in which the own vehicle is located is an environment in which the positional accuracy of the object which is detected based on the image taken by the image taking device lowers.

In the case where the environment satisfies a low-positional-accuracy condition, it is possible to estimate that the positional accuracy of the object detected based on the image taken by the image taking device is less than the set level.

(6) The driving supporter according to any one of the above forms (2) through (5), wherein the lateral-relationship corrector is configured to determine that the positional accuracy of the object is less than the set level and correct the lateral relative positional relationship, to the relationship in which the object and the own vehicle are farther from each other in the lateral direction, when an amplitude of change in the lateral relative positional relationship obtained by the lateral-relationship obtainer is greater than equal to a set amplitude.

In the case where an error in the lateral relative positional relationship is large, it is possible to determine that an error in position of the object detected based on the image taken by the image taking device is large, and the positional accuracy is less than the set level. The set amplitude may be set to a value that makes it possible to consider that the error is large.

(7) The driving supporter according to any one of the above forms (2) through (6), wherein the lateral-relationship obtainer is configured to obtain the lateral relative positional relationship for the object at least partly located within a limitation distance from the own vehicle, and the limitation distance is determined based on (i) a type of at least one of lane lines defining an own lane on which the own vehicle is running and (ii) a length of the at least one of the lane lines detected based on the image taken by the image taking device.

The type of the lane line may be obtained based on information obtained via a navigation system and may be obtained based on the image taken by the image taking device, for example. The driving supporter according to the present form may be applied to obtainment of the relative positional relationship between the object and the own vehicle in a front and rear direction of the own vehicle.

(8) The driving supporter according to any one of the above forms (1) through (7), wherein the situation obtainer comprises:

an image processor configured to process the image taken by the image taking device;

a lane-line detector configured to detect a lane line by processing of the taken image by the image processor; and a lateral-relationship obtainer configured to detect the object by the processing of the taken image by the image processor and obtain a lateral relative positional relationship between the object and the own vehicle, and wherein the lateral-relationship obtainer is configured to obtain the lateral relative positional relationship for the object nearer from the own vehicle in a longitudinal direction of the own vehicle when a positional accuracy of the lane line detected by the lane-line detector is low than when the positional accuracy of the lane line detected by the lane-line detector is high.

(9) The driving supporter according to any one of the above forms (1) through (8), further comprising a driving support suppressor configured to suppress the support of the driving to a greater degree before a deviation angle is obtained than after the deviation angle is obtained, wherein the deviation angle is an angle of a reference axis of the image taking device with respect to a longitudinal axis that is an axis extending in a longitudinal direction of the own vehicle.

Examples of the suppression of the driving support include: a cancel of the driving support; making it difficult for the driving support to be performed; and reduction of the driving support. The driving supporter may include a deviation-angle obtainer configured to obtain the deviation angle of the reference axis with respect to the longitudinal axis.

(10) The driving supporter according to any one of the above forms (2) through (9), wherein the support inhibitor is configured to determine that one of the first relationship and the second relationship is established and determine the object as a corresponding one of the first object and the second object, when the relative positional relationship between the object and the own vehicle which is obtained by the situation obtainer is a set relationship including a relationship in which a value representing the lateral relative positional relationship corrected by the lateral-relationship corrector is less than a set value.

When the relative positional relationship between the object and the own vehicle is the set relationship including the relationship in which the value representing the corrected lateral relative positional relationship is less than the set value, it is estimated that the driver is to perform the steering operation in one of the first direction and the second direction such that the own vehicle avoids the object. The relationship between the object and the own vehicle is the first relationship or the second relationship, and the object corresponds to the first object or the second object. It is noted that each of the first object and the second object is a specific object.

(11) The driving supporter according to any one of the above forms (1) through (9), wherein the threshold-value determiner is configured to determine the threshold value to a value that is less when it is estimated that at least one of the first object and the second object applies a sense of oppression to the driver than when it is not estimated that at least one of the first object and the second object applies a sense of oppression to the driver.

In the case where at least one of the first object and the second object is the object estimated to apply a sense of oppression to the driver, the driver more easily feels a high necessity to perform the steering operation such that the own vehicle avoids the object. Whether the object is the object estimated to apply a sense of oppression to the driver is determined depending upon, e.g., the type and the size of the object. For example, in the case where the object is a large vehicle or a wall having a height greater than or equal to a set height and having a length greater than or equal to a set length, it is estimated that a sense of oppression is applied to the driver. The set height and the set length may be respectively set to a height and a length which may give a sense of oppression to the driver. The set height may be a height that is substantially equal to that of a large vehicle. The threshold-value determiner may include an object-shape obtainer configured to obtain the type and the size of each of the first object and the second object, for example. The shape of the object is determined by the type and the size of the object.

(12) The driving supporter according to any one of the above forms (1) through (11), wherein the threshold-value determiner is configured to determine the threshold value to a value that is less when behavior of at least one of the first object and the second object is unstable than when behavior of the first object and the second object is not unstable.

The threshold-value determiner may include a behavior obtainer configured to obtain behavior of each of the first object and the second object.

(13) The driving supporter according to the above form (11) or (12), wherein the threshold-value determiner comprises a behavior obtainer configured to obtain behavior of each of the first object and the second object based on a state of at least one of a turn-signal lamp, a hazard lamp, and a brake lamp of each of the first object and the second object.

The state of each of the turn-signal lamp, the hazard lamp, and the brake lamp is obtainable based on the image taken by the image taking device.

(14) The driving supporter according to any one of the above forms (1) through (13), wherein the threshold-value determiner is configured to determine the threshold value to a value that is less when a lateral speed that is a lateral component of a speed at which at least one of the first object and the second object approaches the own vehicle is high than when the lateral speed is low.

The magnitude of the lateral speed is one example of a physical quantity representing the behavior of the object. It is possible to consider that the behavior obtainer includes a lateral-speed obtainer configured to obtain the lateral speed.

(15) The driving supporter according to any one of the above forms (1) through (14), further comprising an own-lane-width obtainer configured to obtain a width of an own lane on which the own vehicle is running, wherein the threshold-value determiner is configured to determine the threshold value to a value that is greater when the width of the own lane which is obtained by the own-lane-width obtainer is small than when the width of the own lane which is obtained by the own-lane-width obtainer is large.

The width of the own lane may be obtained by the situation obtainer and may be obtained based on information obtained via the navigation system, for example.

(16) The driving supporter according to any one of the above forms (1) through (15), further comprising a traffic-volume obtainer configured to obtain a traffic volume of vehicles, each as the object, around the own vehicle, wherein the threshold-value determiner is configured to determine the threshold value to a value that is greater when the traffic volume obtained by the traffic-volume obtainer is large than when the traffic volume obtained by the traffic-volume obtainer is small.

(17) A driving supporter configured to perform support of driving such that an own vehicle drives within a lane, the driving supporter comprising:

an own-lane-width obtainer configured to obtain a width of an own lane on which the own vehicle is running;

a traffic-volume obtainer configured to obtain a traffic volume of vehicles, each as an object, around the own vehicle; and a support inhibitor configured to inhibit the support of the driving when a steering-operation value representing a magnitude of a steering operation performed by a driver is greater than a threshold value, wherein the support inhibitor comprises a threshold-value determiner configured to determine the threshold value to a value that is greater in at least one of (i) a case where the width of the own lane which is obtained by the own-lane-width obtainer is less than or equal to a set value and (ii) a case where the traffic volume obtained by the traffic-volume obtainer is large than in a case where the width of the own lane is greater than the set value, and the traffic volume is small.

(18) The driving supporter according to any one of the above forms (1), (7), and (15) through (17), further comprising a radar device configured to emit an electromagnetic wave and receive a reflected wave, wherein the situation obtainer comprises a portion configured to detect at least one of the object and a lane line based on the reflected wave.

The technical features according to any one of the above forms (2) through (6) and (8) through (14) may be incorporated into the driving supporter according to this form.

What is claimed is:

1. A driving supporter configured to perform support of driving such that an own vehicle drives within a lane, the driving supporter comprising:
   an image taking device configured to take an image representing a view in an area;
   at least one processor configured to:
      detect one or more objects in the area based on the image taken by the image taking device;
      obtain a relative positional relationship between the one or more objects and the own vehicle;
      inhibit the support of the driving based on a steering-operation value representing a magnitude of a steering operation performed by a driver being greater than a threshold value;
      determine the threshold value to be a value that is greater when a first object and a second object different from the first object, among the one or more objects, are detected in the image taken by the image taking device than when only the first object is detected in the image, wherein the first object has a first relationship in which the obtained relative positional relationship is a relationship in which it is estimated that the steering operation is to be performed in a first direction in which the own vehicle avoids the first object, and wherein the second object has a second relationship in which the relative positional relationship is a relationship in which it is estimated that the steering operation is to be performed in a second direction reverse to the first direction such that the own vehicle avoids the second object;
      obtain a lateral relative positional relationship between the own vehicle and an object of interest, among the one or more objects;
      determine a value of a positional accuracy of the object of interest based on a clarity of the object of interest in the image taken by the image taking device; and
      correct, based on the positional accuracy of the object of interest being less than a set level, the obtained lateral relative positional relationship to a relationship in which the object of interest and the own vehicle are farther from each other in a lateral direction,
      wherein the value of the positional accuracy corresponds to an ability to detect the object of interest in the image taken by the image taking device.

2. The driving supporter according to claim 1, wherein the processor is further configured to determine the threshold value to be a value that is less when a lateral speed that is a lateral component of a speed at which at least one of the first object or the second object approaches the own vehicle is high than when the lateral speed is low.

3. The driving supporter according to claim 1, wherein the processor is further configured to determine that the positional accuracy of the object of interest is less than the set level and correct the obtained lateral relative positional relationship to the relationship in which the object of interest and the own vehicle are farther from each other in the lateral direction, when the object of interest is located outside an own lane on which the own vehicle is running.

4. The driving supporter according to claim 2, wherein the processor is further configured to determine that the positional accuracy of the object of interest is less than the set level and correct the lateral relative positional relationship between the object of interest and the own vehicle, to the relationship in which the object of interest and the own vehicle are farther from each other in the lateral direction, when an environment in which the own vehicle is located is an environment in which the value of the positional accuracy of the object of interest lowers.

5. The driving supporter according to claim 2, wherein the processor is further configured to determine that the positional accuracy of the object of interest is less than the set level and correct the lateral relative positional relationship, to the relationship in which the object of interest and the own vehicle are farther from each other in the lateral direction, when an amplitude of change in the obtained lateral relative positional relationship is greater than or equal to a set amplitude.

6. The driving supporter according to claim 2, wherein the processor is further configured to, based on the object of interest being at least partially located within a limitation distance from the own vehicle, obtain the lateral relative positional relationship for the object of interest, and the limitation distance is determined based on (i) a type of at least one of lane lines defining an own lane on which the own vehicle is running and (ii) a length of the at least one of the lane lines detected based on the image taken by the image taking device.

7. The driving supporter according to claim 1, wherein the processor is further configured to suppress the support of the driving to a greater degree before a deviation angle is obtained than after the deviation angle is obtained,
   wherein the deviation angle is an angle of a central axis of the image taking device with respect to a longitudinal axis that is an axis extending in a longitudinal direction of the own vehicle.

8. The driving supporter according to claim 2, wherein the processor is configured to determine that one of the first relationship and the second relationship is established and determine the object of interest as a corresponding one of the first object and the second object, based on the obtained relative positional relationship between the object of interest and the own vehicle which is a set relationship including a relationship in which a value representing the lateral relative positional relationship corrected by the lateral-relationship corrector is less than a set value.

9. The driving supporter according to claim 1, wherein the processor is configured to determine the threshold value based on an estimation that the driver will perform avoidance steering due to one of a type, a size, and a behavior of the one or more objects.

10. The driving supporter according to claim 1, wherein the processor is further configured to determine the threshold value to be a value that is less when behavior of at least one of the first object or the second object is unstable than when behavior of the first object and the second object is stable.

* * * * *